(12) United States Patent
Cook et al.

(10) Patent No.: US 8,182,183 B2
(45) Date of Patent: May 22, 2012

(54) SYSTEMS AND METHODS FOR SECURING COMPONENTS

(75) Inventors: Jay W. Cook, China Spring, TX (US); Herbert A. Courtney, III, Hubbard, TX (US)

(73) Assignee: L-3 Communications Integrated Systems L.P., Greenville, TX (US)

( * ) Notice: Subject to any disclaimer, the term of this patent is extended or adjusted under 35 U.S.C. 154(b) by 666 days.

(21) Appl. No.: 12/313,269

(22) Filed: Nov. 18, 2008

(65) Prior Publication Data

US 2010/0124457 A1 May 20, 2010

(51) Int. Cl.
*B61D 45/00* (2006.01)
*B64C 1/20* (2006.01)

(52) U.S. Cl. ............... 410/105; 410/104; 244/118.1
(58) Field of Classification Search ............... 244/118.1; 410/104, 105; 403/408.1
See application file for complete search history.

(56) References Cited

U.S. PATENT DOCUMENTS

| | | | |
|---|---|---|---|
| 4,230,432 A * | 10/1980 | Howell | 410/105 |
| 5,520,357 A * | 5/1996 | Payne et al. | 410/105 |
| 5,871,318 A * | 2/1999 | Dixon et al. | 410/105 |
| 6,260,813 B1 * | 7/2001 | Whitcomb | 410/105 |
| 7,861,996 B2 * | 1/2011 | Ponzo De Siqueira | 410/105 |
| 2007/0063122 A1 * | 3/2007 | Bowd et al. | 248/429 |
| 2009/0230241 A1 * | 9/2009 | Heller et al. | 244/118.1 |

FOREIGN PATENT DOCUMENTS

| | | | |
|---|---|---|---|
| DE | 202004007781 U1 * | 9/2004 | |
| DE | 202005000134 U1 * | 7/2005 | |
| EP | 200511 A2 * | 11/1986 | |
| WO | WO 2007131791 A1 * | 11/2007 | |

OTHER PUBLICATIONS

Ancra International Aircraft Fittings, "Ancra-Lock Quick Install Fitting System", Printed from Internet Sep. 26, 2008, 4 pgs.
Nylok, "Blue Patch", Publically available prior to the filing date of the present application, 2 pgs.
Military Specification Sheet, "Track and Stud Fitting for Cargo Transport Aircraft, Standard Dimensions for", MS33601, Jul. 31, 1991, 1 pg.
Ancra International, 44413, Apr. 1982, 1 pg.

* cited by examiner

*Primary Examiner* — Victor MacArthur
(74) *Attorney, Agent, or Firm* — O'Keefe, Egan, Peterman & Enders LLP (57) ABSTRACT

Systems and methods for securing seats and other components to a seat track that may be implemented to provide flush symmetric and asymmetric seat track fitting assemblies that accommodate variances in the height of seat track extrusions. A component may be secured to mate directly with a seat track fitting surface and uppermost surface (flange) of a seat track, and with a fitting securing component (retainer or capture component) that provides additional load path in the lateral shear plane (X axis) while optimizing length of thread engagement of the component fastener.

34 Claims, 8 Drawing Sheets

SYSTEMS AND METHODS FOR SECURING COMPONENTS

This invention was made with United States Government support under Contract No. N00019-05-C-0030. The Government has certain rights in this invention.

FIELD OF THE INVENTION

This invention relates generally to securing systems, and more particularly to systems and methods for securing seats and other components.

BACKGROUND OF THE INVENTION

Conventional flush seat track fitting assemblies are produced for installation in a variety of different seat track extrusion configurations and are typically manufactured in a high volume, low cost manner from cast or forged materials. Such seat track fitting assemblies are configured to introduce a gap between the fitting and the component being secured in order to accommodate variations in seat track dimensional configuration. Conventional seat track fitting assemblies also employ retaining devices that temporarily hold a seat track fitting in place relative to the seat track. These retaining devices are not secured to the fitting but simply held in place pending component installation to the fitting itself. After component installation, these conventional retaining devices remain trapped in place between the component and the seat track.

SUMMARY OF THE INVENTION

Disclosed herein are systems and methods for securing (e.g., mounting) seats and other components to a seat track, e.g., such as an elongated seat track employed in an aircraft cabin. The disclosed systems and methods may be advantageously implemented for securing components in a variety of applications including, but not limited to, aviation and aerospace applications (e.g., fixed wing aircraft, helicopters, spacecraft, etc.), automotive applications (e.g., for trucks, recreational vehicles, etc.), marine applications (e.g., for ships, submarines, boats, etc.), etc. Example specific industries in which the disclosed systems and methods may be advantageously employed include, but are not limited to, aircraft and marine manufacturing industries, interior manufacturing and modification/repair facilities, trucking/freight industry, etc.

In one exemplary embodiment, the disclosed systems and methods may be implemented to provide flush symmetric and asymmetric seat track fitting assemblies which meet military specification (MS) 33601 seat track standard dimensions to accommodate variances in the height of seat track extrusions. The disclosed systems and methods may be further implemented in a manner that allows a component being secured to mate directly with a seat track fitting surface and uppermost surface (flange) of the seat track, and with a fitting securing component (retainer or capture component) that provides additional load path in the lateral shear plane (X axis) while optimizing length of thread engagement of the component fastener. In a further exemplary embodiment, a component fastener hole and fitting retaining device (retainer) fastener holes may be implemented to include an optional self-locking feature (e.g., nylon "Nylon Bluepatch" or other similar material that is adhered to the internal threads of the component fastener hole and/or external threads of the component fastener) for ease of installation.

Due to optimized (i.e., increased) length of component fastener thread engagement, one embodiment of the disclosed systems and methods may be advantageously employed for interior component securing applications (e.g., such as cabinets, partitions, etc.) with relatively high longitudinal and lateral force restraint requirements for which conventional flush seat track fitting assemblies are unsuited. The disclosed systems and methods thus may be implemented to provide additional load carrying capability, fitting security, and with an optional protective (e.g., corrosion resistant) finish to allow for use in automotive, aviation and marine applications. In one exemplary embodiment, the disclosed seat track fitting assemblies may be manufactured so as to be capable of withstanding greater shear and compression forces than the seat track to which they are attached.

In one respect, disclosed herein is a seat track fitting assembly, including: a base component having at least two pairs of opposing arcuately extending convex retention profiles separated by a narrowed profile section, the at least two pairs of opposing arcuately extending convex retention profiles of the base component being spaced and dimensioned to be aligned and received in an insertion position of the base component between any two respective opposing pairs of arcuately recessed concave insertion walls of a seat track so as to be inserted into opposing internal anchor profiles of the seat track, and the narrowed profile section of the base component being dimensioned to be received between opposing inner retention walls of the seat track when the base component is in the insertion position and the at least two pairs of opposing arcuately extending convex retention profiles are received between any two respective opposing pairs of arcuately recessed concave insertion walls of a seat track. The base component may be further dimensioned to be positioned from the insertion position into a locking position within the opposing internal anchor profiles of the seat track so that the at least two pairs of opposing arcuately extending convex retention profiles of the base component are not aligned with any two respective opposing pairs of arcuately recessed concave insertion walls of the seat track, each of the at least two pairs of opposing arcuately extending convex retention profiles of the base component being positioned at least partially beneath a pair of opposing inner retention walls of the seat track when the base component is in the locking position. The seat track fitting assembly may further include a fitting securing component dimensionally configured for mating to the base component when the base component is in the locking position within the seat track, the fitting securing component including at least one pair of opposing arcuately extending convex retention profiles that are dimensioned to be received between an opposing pair of arcuately recessed concave insertion walls of the seat track when the base component is in the locking position so that the base component is not positionable from the locking position to the insertion position when the fitting securing component is mated to the base component. The base component may further include a component fastener retaining opening defined therein, the component fastener retaining opening being configured for receiving a component fastener for securing a component to the seat track when the base component is in the locking position within the seat track.

In another respect, disclosed herein is a seat track and seat track fitting assembly, including: a seat track, the seat track including an elongated member having an upper surface and an elongated cavity that is oriented parallel to the longitudinal axis of the seat track, the elongated cavity including an elongated central access channel defined by opposing inner retention walls in the upper surface of the seat track and by insertion openings defined in the upper surface of the seat track by pairs of opposing arcuately recessed concave insertion walls, the elongated cavity also including an elongated anchor channel defined internally within the elongated member of the seat track beneath the elongated access channel by opposing internal anchor profiles; a base component having at least two pairs of opposing arcuately extending convex retention profiles separated by a narrowed profile section, the at least two pairs of opposing arcuately extending convex retention profiles of the base component being spaced and dimensioned to be aligned and received in an insertion position of the base component between any two respective opposing pairs of the arcuately recessed concave insertion walls of the seat track so as to be inserted into the opposing internal anchor profiles of the seat track anchor channel, and the narrowed profile section of the base component being dimensioned to be received between the opposing inner retention walls of the access channel of the seat track when the base component is in the insertion position and the at least two pairs of opposing arcuately extending convex retention profiles are received between any two of the respective opposing pairs of arcuately recessed concave insertion walls of the seat track. The base component may be further dimensioned to be positioned from the insertion position into a locking position within the opposing internal anchor profiles of the seat track so that the at least two pairs of opposing arcuately extending convex retention profiles of the base component are not aligned with any two respective opposing pairs of arcuately recessed concave insertion walls of the seat track, each of the at least two pairs of opposing arcuately extending convex retention profiles of the base component being positioned at least partially beneath a pair of opposing inner retention walls of the seat track when the base component is in the locking position. The seat track fitting assembly may further include a fitting securing component dimensionally configured for mating to the base component when the base component is in the locking position within the seat track, the fitting securing component including at least one pair of opposing arcuately extending convex retention profiles that are dimensioned to be received between an opposing pair of the arcuately recessed concave insertion walls of the seat track when the base component is in the locking position so that the base component is not positionable within the seat track anchor channel from the locking position to the insertion position when the fitting securing component is mated to the base component. The base component further includes a component fastener retaining opening defined therein, the component fastener retaining opening being configured for receiving a component fastener for securing a component to the seat track when the base component is in the locking position within the seat track.

In another respect, disclosed herein is a method of securing a component to a seat track, including: providing a seat track, the seat track including an elongated member having an upper surface and an elongated cavity that is oriented parallel to the longitudinal axis of the seat track, the elongated cavity including an elongated central access channel defined by opposing inner retention walls in the upper surface of the seat track and by insertion openings defined in the upper surface of the seat track by pairs of opposing arcuately recessed concave insertion walls, the elongated cavity also including an elongated anchor channel defined internally within the elongated member of the seat track beneath the elongated access channel by opposing internal anchor profiles; providing a base component having at least two pairs of opposing arcuately extending convex retention profiles separated by a narrowed profile section; providing a fitting securing component including at least one pair of opposing arcuately extending convex retention profiles; aligning the at least two pairs of opposing arcuately extending convex retention profiles of the base component in an insertion position between two respective opposing pairs of the arcuately recessed concave insertion walls of the seat track and inserting the two pairs of opposing arcuately extending convex retention profiles of the base component through the two respective opposing pairs of the arcuately recessed concave insertion walls of the seat track into the opposing internal anchor profiles of the seat track anchor channel with the narrowed profile section of the base component received between the opposing inner retention walls of the access channel of the seat track; moving the base component from the insertion position into a locking position within the opposing internal anchor profiles of the seat track so that the at least two pairs of opposing arcuately extending convex retention profiles of the base component are not aligned with any two respective opposing pairs of arcuately recessed concave insertion walls of the seat track, and so that each of the at least two pairs of opposing arcuately extending convex retention profiles of the base component are positioned at least partially beneath a pair of opposing inner retention walls of the seat track; assembling a fitting securing component to the base component when the base component is in the locking position within the seat track by positioning the at least one pair of opposing arcuately extending convex retention profiles of the fitting securing component between an opposing pair of the arcuately recessed concave insertion walls of the seat track when the base component is in the locking position so that the base component is not positionable within the seat track anchor channel from the locking position to the insertion position; and securing a component to the assembly of the base component and the fitting securing component, by positioning a component fastener within the component fastener retaining opening of the base component to secure the component to the seat track when the base component is in the locking position within the seat track.

DESCRIPTION OF ILLUSTRATIVE EMBODIMENTS

Figure 1:
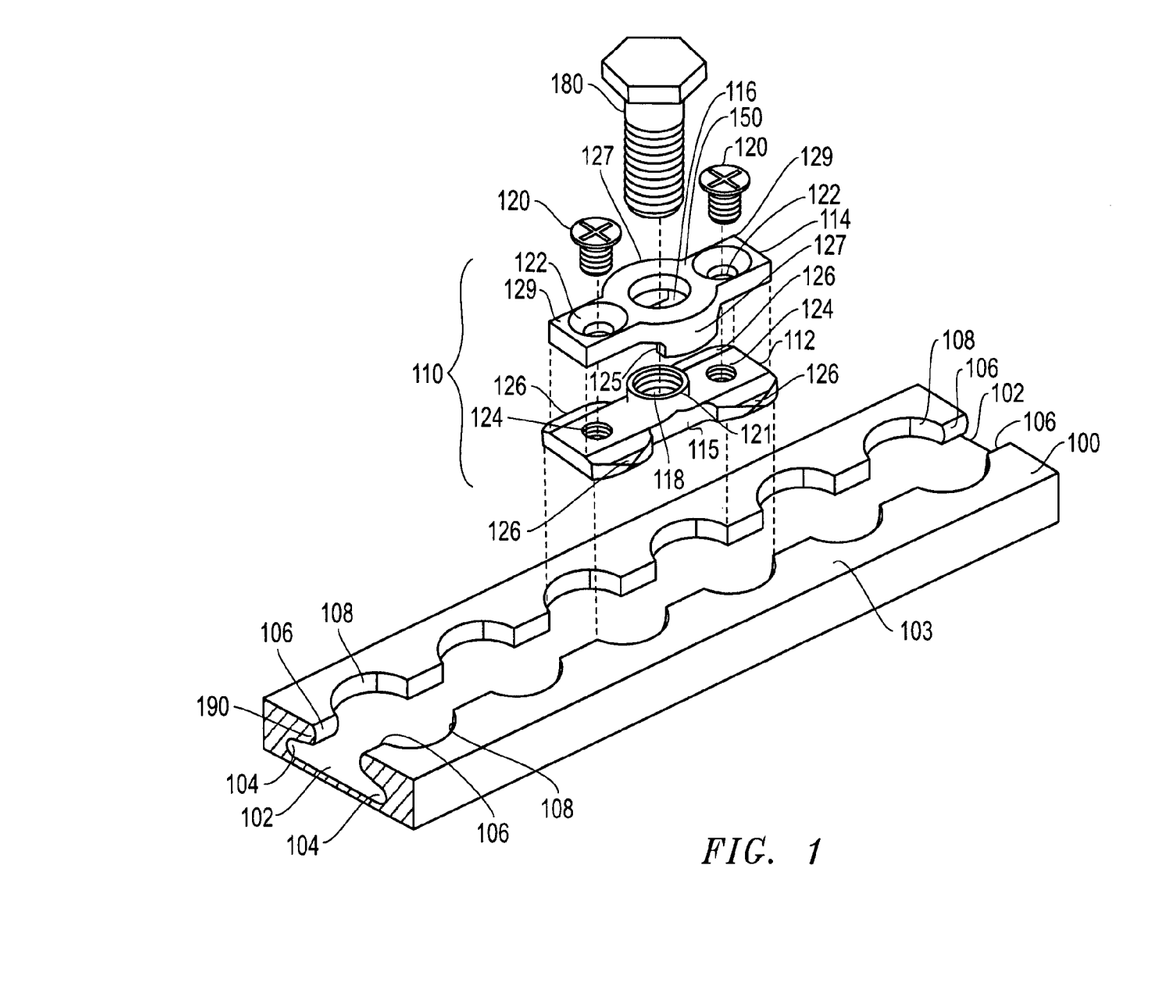
FIG. 1 is an exploded perspective view of a seat track and symmetric seat track fitting assembly according to one exemplary embodiment of the disclosed systems and methods.
Figure 2:
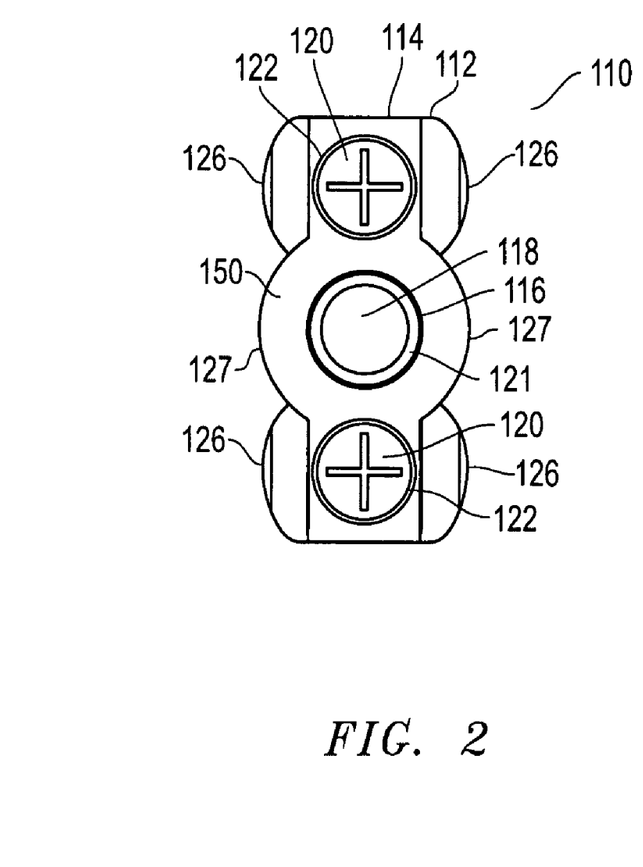
FIG. 2 is a top view of a symmetric seat track fitting assembly according to one exemplary embodiment of the disclosed systems and methods.
Figure 10:
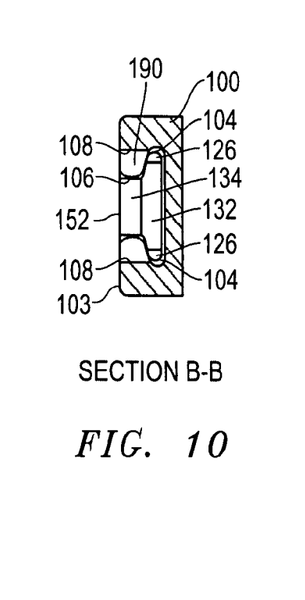
FIG. 10 is cross-sectional end view of seat track and a base component of an asymmetric seat track fitting assembly according to one exemplary embodiment of the disclosed systems and methods.

FIG. 1 illustrates an exploded view of a symmetric seat track fitting assembly 110 according to one exemplary embodiment of the disclosed systems and methods. In FIG. 1, symmetric seat track fitting assembly 110 is shown positioned for assembly to a conventional seat track 100. In this case, conventional seat track 100 is an elongated metal (e.g., aluminum) member having an elongated cavity 102 defined therein that is oriented parallel to the longitudinal axis of seat track 100. As shown, elongated cavity 102 includes an elongated central access channel defined by opposing inner retention walls 106 in the upper flange 190 of seat track 100 and by insertion openings defined therein by pairs of opposing arcuately recessed concave insertion walls 108. Elongated cavity 102 also includes an elongated anchor channel defined within the body of seat track 100 and beneath the elongated access channel by opposing internal anchor profiles 104. In this embodiment, elongated anchor channel is at least as wide as the spacing between opposing arcuately recessed concave insertion walls 108 to allow insertion of opposing arcuately extending convex retention profiles 126 of a seat track fitting assembly base component in a manner as will be described further herein (e.g., see cross-sectional view of FIG. 10).

As further shown in FIG. 1, symmetric seat track fitting assembly 110 includes a base component 112 and a separate fitting securing component 114. Each of base component 112 and separate fitting securing component 114 may be constructed of any material (e.g., steel or other metal) suitable for supporting the load (e.g., seats, cabinets, partitions, etc.) to which it is to be attached for a particular application. Further, symmetric seat track fitting assembly 110 may be constructed so as to be capable of withstanding greater shear and/or compression forces than conventional seat track 100 to which it is to be attached (i.e., such that conventional seat track 100 will fail in response to high stress before attached symmetric seat track fitting assembly 110). For example, in one exemplary embodiment, base component 112 and fitting securing component 114 may be 4130 alloy steel that is heat treated to a tensile strength of 180-200 KPSI (thousand pounds per square inch) per AMS-H-6875. In such an embodiment, symmetric seat track fitting assembly 110 may be capable of exceeding up to about 5100 pounds of shear force (i.e., in the forward to aft axis direction relative to the seat track). In a further exemplary embodiment, each of base component 112 and separate fitting securing component 114 may also be cadmium plated for corrosion resistance, e.g., for wet or moist area applications.

Figure 5:
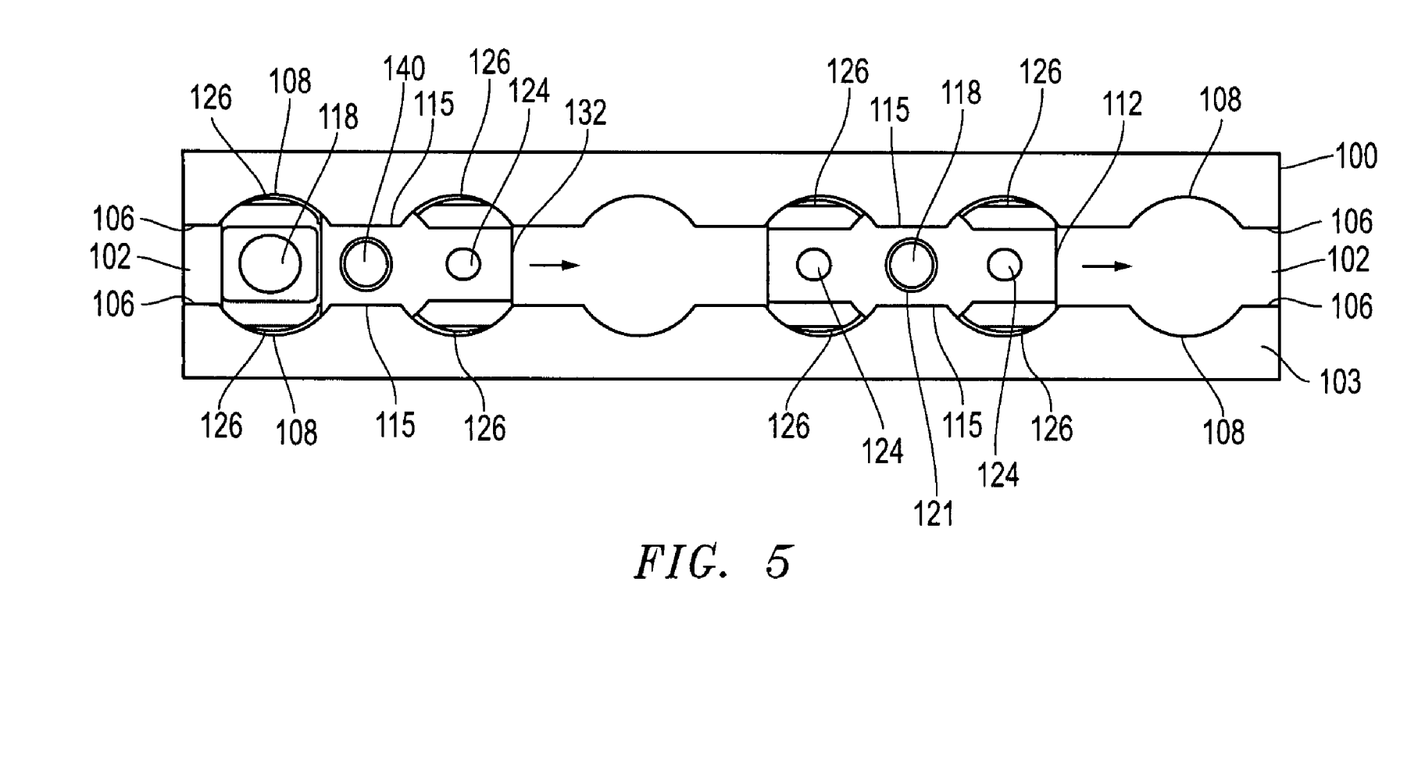
FIG. 5 is a top view of a seat track, a base component of a symmetric seat track fitting assembly, and a base component of an asymmetric seat track fitting assembly according to exemplary embodiments of the disclosed systems and methods.

Base component 112 is an elongated member having opposing ends with a pair of opposing arcuately extending convex retention profiles 126 disposed adjacent each opposing end of base component 112. The two pairs of opposing arcuately extending convex retention profiles 126 are spaced and dimensioned to be received between any two respective opposing pairs of arcuately recessed concave insertion walls 108 of seat track 100. As further shown, arcuately extending convex retention profiles 126 of base component 112 are separated by narrowed profile sections 115 that are dimensioned to be received between opposing inner retention walls 106 of seat track 100. As so configured in FIG. 1, base component 112 may be inserted downward through the central access channel into the enlarged anchor channel of elongated cavity 102 of seat track 100 when opposing arcuately extending convex retention profiles 126 of base component 112 are aligned in an insertion position with opposing pairs of arcuately recessed concave insertion walls 108 of seat track 100 as shown in FIGS. 1 and 5. Arcuately extending convex retention profiles 126 of base component 112 are further dimensioned to fit beneath opposing inner retention walls 106 of seat track 100 so that base component 112 is slidable within elongated cavity 102 from the insertion position to a locked position in which extending retention profiles 126 are position beneath opposing inner retention walls 106 to prevent upward removal of base component 112 from seat track 100. Base component 112 further includes an upwardly extending alignment post 121 that has an internally threaded component fastener retaining opening 118 defined therein. In this embodiment, internally component fastener retaining opening 118 is configured for threadably receiving a complementary externally threaded component fastener 180 (e.g., externally threaded bolt such as 0.3125-24 UNJF-3B (NAS6605)) that may be employed to secure a seat or other component to base component 112.

Still referring to FIG. 1, fitting securing component 114 is dimensionally configured for mating over base component 112 as shown. As shown, fitting securing component 114 includes two extending ends 129 that each have an inter-component fastener access opening 122 defined therein that is dimensioned for receiving an externally threaded inter-component fastener 120, e.g., in the form of a threaded countersunk screw for this exemplary embodiment. Base component 112 includes two internally threaded inter-component fastener retention openings 124 for receiving externally threaded inter-component fasteners 120 with fitting securing component 114 therebetween in a manner that allows fitting securing component 114 to be secured over base component 112 with inter-component fasteners 120. Fitting securing component 114 further includes a component fastener access opening 116 that is configured to align with upwardly extending alignment post 121 when fitting securing component 114 is assembled over base component 112 and so that component fastener 180 may be inserted through component fastener access opening 116 and threaded into component fastener retaining opening 118 to secure a seat or other component to base component 112 with fitting securing component 114 therebetween. As so configured, threaded inter-component fasteners 120 in combination with extending ends 129 and arcuately extending convex retention profiles 127 of fitting securing component 114 provide additional load path in the lateral shear plane (i.e., horizontal x-axis that extends parallel to the longitudinal axis of seat track 100) for symmetric seat track fitting assembly 110, while also allowing for optimized length of thread engagement between component fastener 180 and component fastener retaining opening 118 as further described below. Moreover, in the illustrated exemplary embodiment, the upper surface of fitting securing component 114 and countersunk threaded inter-component fasteners 120 together present a substantially flat and planar surface for receiving and stabilizing a component load when secured to assembly 110 by retaining fastener 180.

Figure 6:
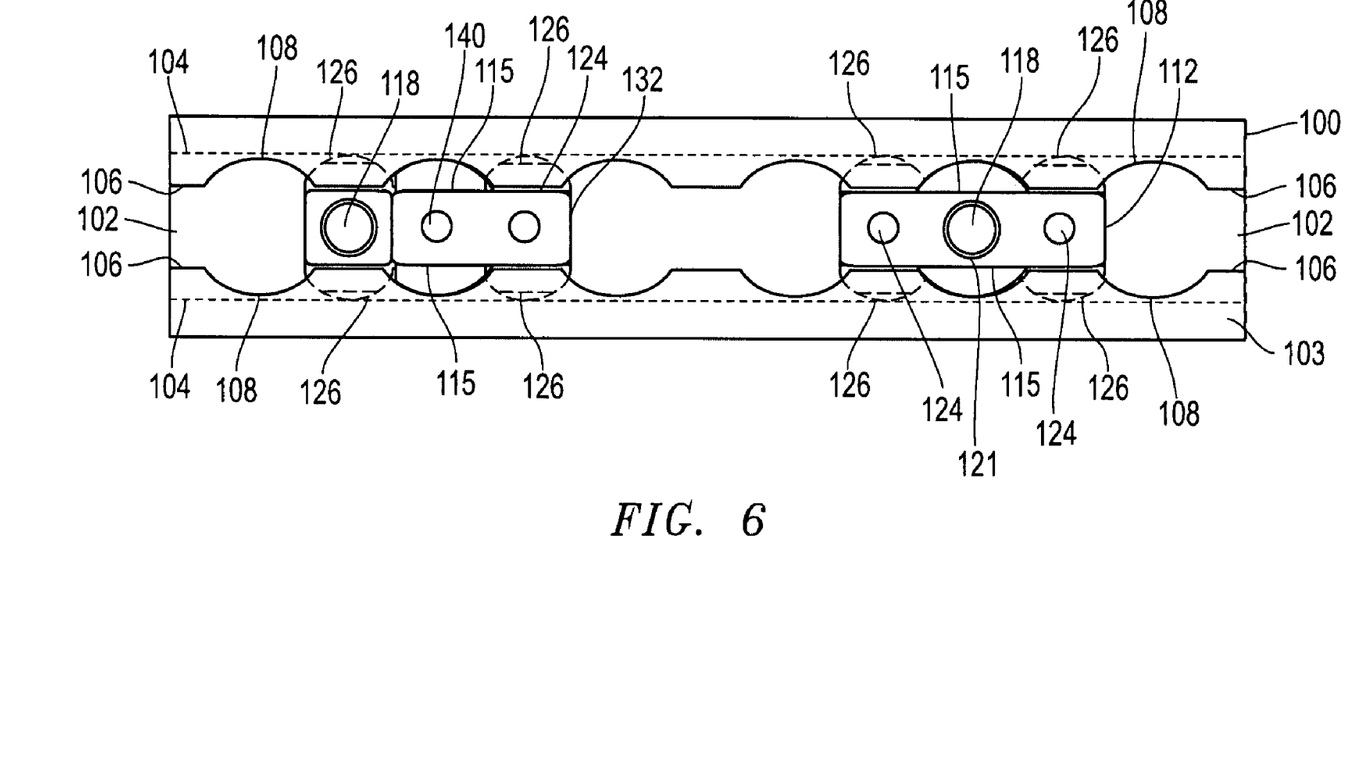
FIG. 6 is a top view of a seat track, a base component of a symmetric seat track fitting assembly, and a base component of an asymmetric seat track fitting assembly according to exemplary embodiments of the disclosed systems and methods.

As shown in FIG. 1, fitting securing component 114 includes arcuately extending convex retention profiles 127 that are dimensioned to be received between an opposing pair of arcuately recessed concave insertion walls 108 of seat track 100 in a manner similar to arcuately extending convex retention profiles 126 of base component 112. Each of arcuately extending convex retention profiles 127 of fitting securing component 114 may further be provided with optional retention shoulders 125 for the purpose of alignment and increased load path capability. As so configured, fitting securing component 114 may be assembled over base component 112 after base component 112 is first inserted into seat track 100 and slid from insertion position into locking position in the direction of the arrow shown in FIG. 5 so that each pair of arcuately extending convex retention profiles 126 is positioned within opposing internal anchor profiles 104 and centered beneath a pair of inner retention walls 106 as shown in dashed outline in FIG. 6. In this position, arcuately extending convex retention profiles 126 are prevented from upward removal from seat track 100 because they are retained within seat track 100 by opposing internal anchor profiles 104 and beneath inner retention walls 106.

Figure 7:
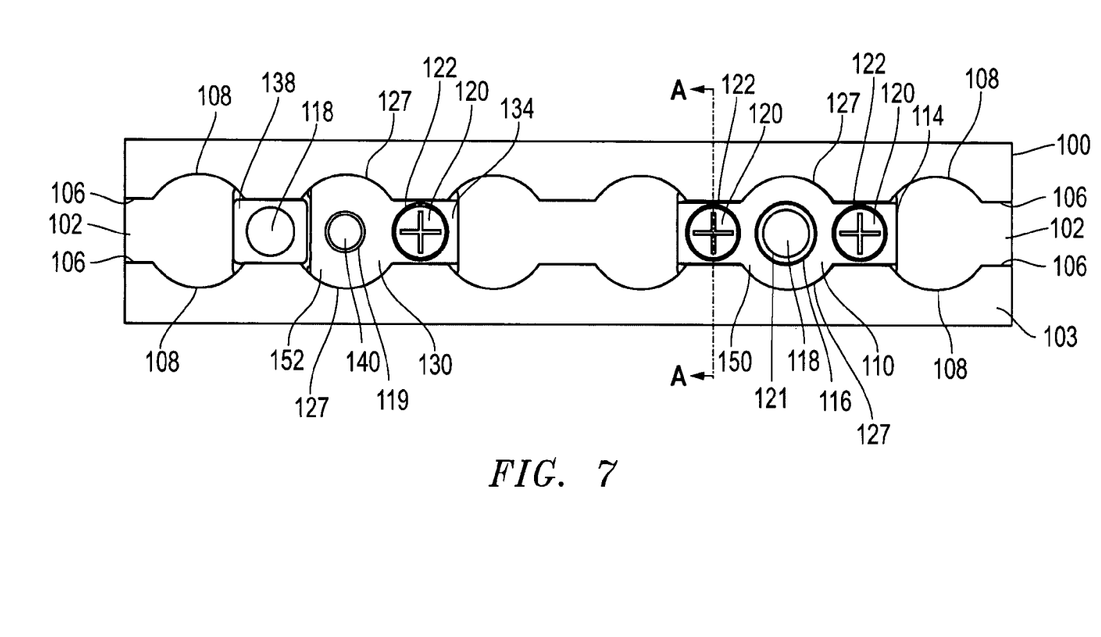
FIG. 7 is a top view of a seat track, a symmetric seat track fitting assembly, and an asymmetric seat track fitting assembly according to exemplary embodiments of the disclosed systems and methods.
Figure 8:
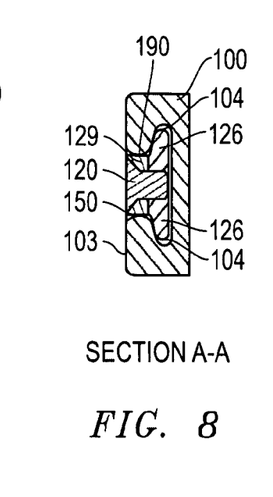
FIG. 8 is cross-sectional end view of seat track and a base component of a symmetric seat track fitting assembly according to one exemplary embodiment of the disclosed systems and methods.
Figure 9:
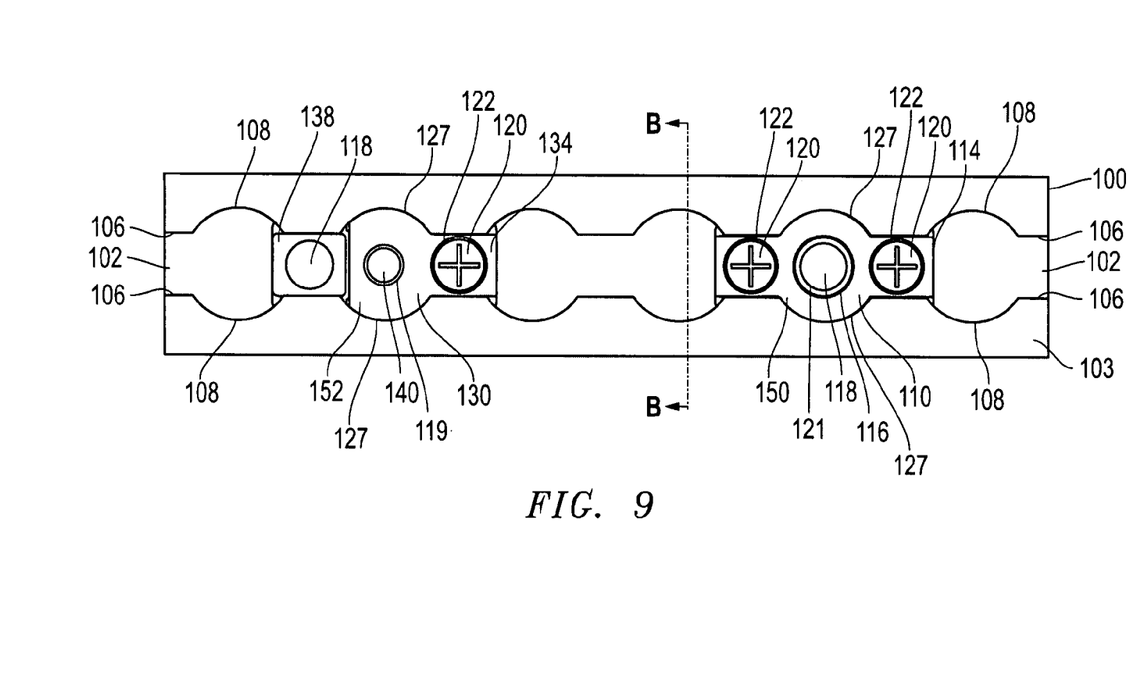
FIG. 9 is a top view of a seat track, a symmetric seat track fitting assembly, and an asymmetric seat track fitting assembly according to exemplary embodiments of the disclosed systems and methods.

FIGS. 7-10 show fitting securing component 114 assembled over base component 112 with base component 112 received in seat track 100 in locking position, i.e., with arcuately extending convex retention profiles 126 of base component 112 positioned within opposing internal anchor profiles 104 and centered beneath a pair of inner retention walls 106. At the same time, arcuately extending convex retention profiles 127 of fitting securing component 114 are received between an opposing pair of arcuately recessed concave insertion walls 108 of seat track 100 as shown to lock the assembly 110 in static position relative to elongated cavity 102 of seat track 100. In this regard, symmetric seat track fitting assembly 110 is prevented from longitudinal movement in the elongated cavity 102 of seat track 100 by contact (interference) between retention profiles 127 of fitting securing component 114 and arcuately recessed concave insertion walls 108 of seat track 100. As shown in FIGS. 7-9, fitting securing component 114 is secured over base component 112 with inter-component fasteners 120 which are inserted through countersunk inter-component fastener access openings 122 of fitting securing component 114 and threadably received in inter-component fastener retention openings 124 of base component 112 to secure fitting securing component 114 over base component 112 in its locked position relative to elongated cavity 102 of seat track 100.

Figure 11:
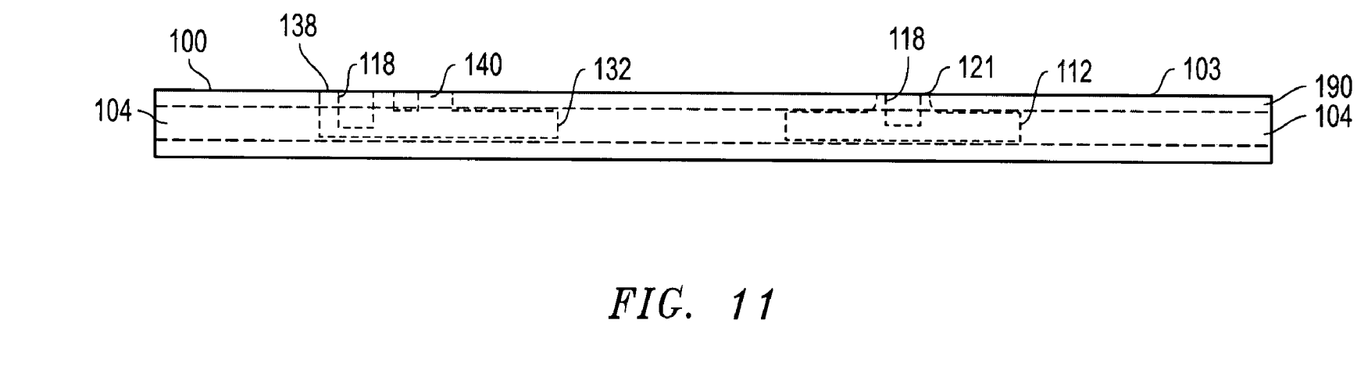
FIG. 11 is a side view of a seat track, a base component of a symmetric seat track fitting assembly, and a base component of an asymmetric seat track fitting assembly according to exemplary embodiments of the disclosed systems and methods.

FIG. 11 is a side view of base component 112 received within internal anchor profile 104 (shown in dashed line in FIG. 11) seat track 100. As shown in FIG. 11, upwardly extending alignment post 121 extends to a position that is substantially even or coplanar with upper surface 103 of seat track 100. As previously described, internally component fastener retaining opening 118 is defined within upwardly extending alignment post 121 as shown in dashed outline in FIG. 11. As such, the disclosed embodiment of base component 112 illustrated in FIG. 11 provides threads that extend from below to a position that is even or coplanar with the plane of upper surface 103 for engagement with threaded component fastener 180, providing for increased length of thread engagement and strength for securing components to seat track 100.

Figure 12:
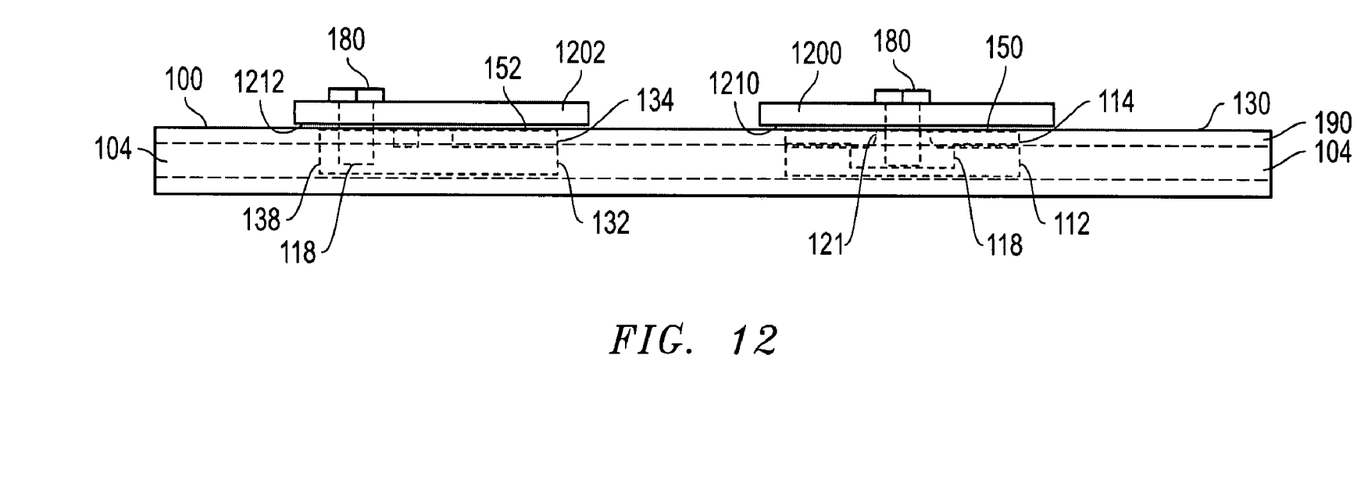
FIG. 12 is a side view of a seat track, with components secured thereto by a symmetric seat track fitting assembly and an asymmetric seat track fitting assembly according to exemplary embodiments of the disclosed systems and methods.

FIG. 12 is a side view of fitting securing component 114 assembled to base component 112 of FIG. 11 to form symmetric seat track fitting assembly 110 within seat track 100. As shown in FIG. 12, the upper surface 150 of fitting securing component 114 is positioned substantially coplanar with upper surface 103 of seat track 100. FIG. 12 further shows a component 1200 (e.g., seat, cabinet, partition, etc.) secured to seat track 100 by a component fastener 180, with lower surface 1210 of component 1200 contacting and being supported by each of upper surface 103 of seat track 100 and upper surface 150 of fitting securing component 114. In this way, additional load path in the lateral shear plane (X axis) is provided for component 120. In one exemplary embodiment, component retaining fastener 180 may be secureably retained in component fastener retaining opening 118 with an optional self-locking feature, such as ring of nylon (e.g., "Nyloc Blue-patch" applied by Nylock Fastener Corporation of Anaheim, Calif.) or other similar material that is adhered as a ring inside the one or more threads of component fastener retaining opening 118.

Figure 3:
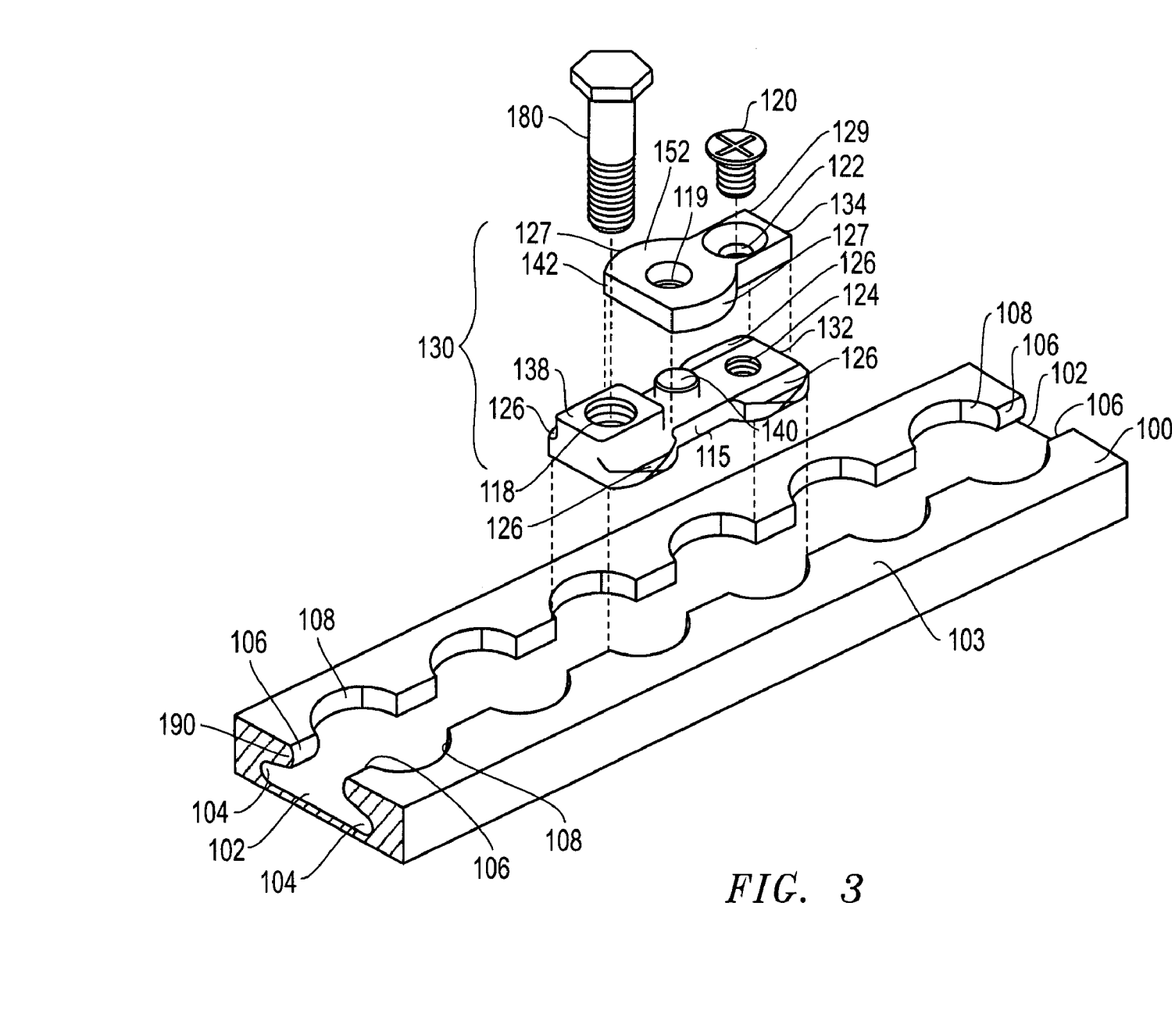
FIG. 3 is an exploded perspective view of a seat track and asymmetric seat track fitting assembly according to one exemplary embodiment of the disclosed systems and methods.
Figure 4:
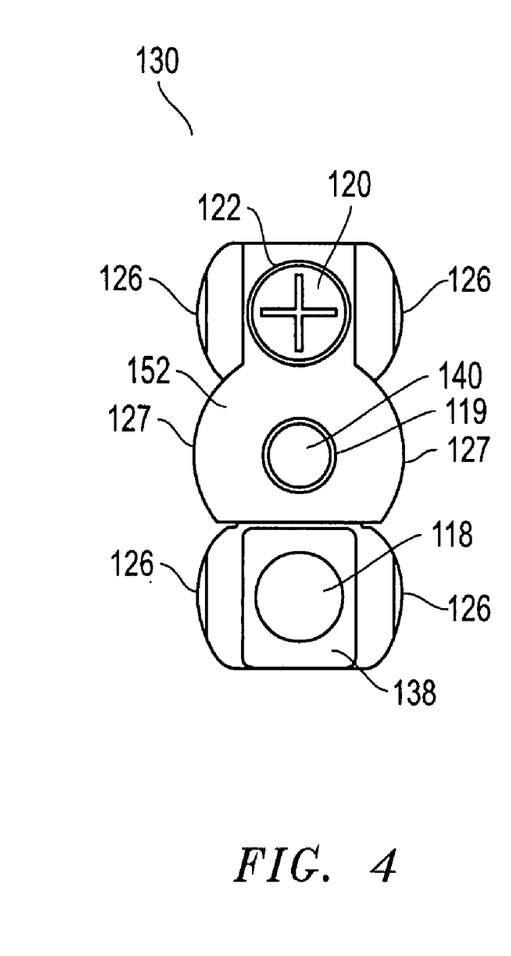
FIG. 4 is a top view of an asymmetric seat track fitting assembly according to one exemplary embodiment of the disclosed systems and methods.

Referring now to FIG. 3, an exploded view is shown of an asymmetric seat track fitting assembly 130 according to another exemplary embodiment of the disclosed systems and methods. In FIG. 3, asymmetric seat track fitting assembly 130 is shown positioned for assembly to a conventional seat track 100 of the same type as illustrated and described in relation to FIG. 1. As shown, asymmetric seat track fitting assembly 130 includes a base component 132 and a separate retainer or capture component 134. Each of base component 132 and a separate retainer or capture component 134 may be constructed of any material (e.g., steel or other metal) suitable for supporting the load (e.g., seats, cabinets, partitions, etc.) to which it is to be attached for a particular application. In this regard, asymmetric seat track fitting assembly 130 may be constructed of similar materials to withstand similar stresses as described above for symmetric seat track fitting assembly 110. Asymmetric seat track fitting assembly 130 may be further coated with similar corrosion-resistant material as described above for symmetric seat track fitting assembly 110.

Base component 132 is an elongated member having two pairs of opposing arcuately extending convex retention profiles 126 that are dimensioned to be received between any two respective opposing pairs of arcuately recessed concave insertion walls 108 of seat track 100. As further shown, arcuately extending convex retention profiles 126 of seat track fitting assembly 130 are separated by narrowed profile sections 115 that are dimensioned to be received between opposing inner retention walls 106 of seat track 100. As so configured in FIG. 3, base component 132 may be inserted downward through the central access channel into the enlarged anchor channel of elongated cavity 102 of seat track 100 when arcuately extending convex retention profiles 126 of base component 132 are aligned in an insertion position with opposing pairs of arcuately recessed concave insertion walls 108 of seat track 100 as shown in FIGS. 3 and 5. Arcuately extending convex retention profiles 126 of base component 132 are further dimensioned to fit beneath opposing inner retention walls 106 of seat track 100 so that base component 132 is slidable within elongated cavity 102 from the insertion position to a locked position in which extending retention profiles 126 are position beneath opposing inner retention walls 106 to prevent upward removal of base component 132 from seat track 100. Base component 132 further includes an upwardly extending securement block 138 that has an internally threaded component fastener retaining opening 118 defined therein. Rectangular section 138 is dimensioned as shown to be received between opposing inner retention walls 106. In this embodiment, internally component fastener retaining opening 118 is configured for threadably receiving a complementary externally threaded component fastener 180 (e.g., externally threaded bolt) that may be employed to secure a seat or other component to base component 132.

Still referring to FIG. 3, a fitting securing component 134 in the form of a retainer/capture component 134 is dimensionally configured for mating over base component 132 as shown. As shown, fitting securing component 134 inludes one extending end 129 that has an inter-component fastener access opening 122 defined therein that is dimensioned for receiving an externally threaded inter-component fastener 120, e.g., in the form of a threaded countersunk screw for this exemplary embodiment. The opposing end 142 of fitting securing component 134 is dimensioned and shaped complementary to upwardly extending securement block 138 as shown so that it fits adjacent upwardly extending securement block 138 when fitting securing component 134 is mated (assembled over) base component 132.

Base component 132 includes a corresponding internally threaded inter-component fastener retention opening 124 for receiving externally threaded inter-component fastener 120 with fitting securing component 134 therebetween in a manner that allows fitting securing component 134 to be secured over base component 132 with inter-component fastener 120. Fitting securing component 134 further includes an alignment opening 119 that is configured to align with upwardly extending alignment post 140 when fitting securing component 134 is assembled over base component 132. As further shown, component fastener 180 may be threaded into component fastener retaining opening 118 to secure a seat or other component to base component 132. As so configured, threaded inter-component fastener 120 in combination with extending end 129 and arcuately extending convex retention profiles 127 of fitting securing component 134 provide additional load path in the lateral shear plane (i.e., horizontal x-axis that extends parallel to the longitudinal axis of seat track 100) for asymmetric seat track fitting assembly 130, while upwardly extending alignment post 140 provides for optimized length of thread engagement between component fastener 180 and component fastener retaining opening 118 as further described below. Moreover, in the illustrated exemplary embodiment, the upper surface of fitting securing component 134 and countersunk threaded inter-component fastener 120 together present a substantially flat and planar surface for receiving and stabilizing a component load when secured to assembly 130 by retaining fastener 180.

As shown in FIG. 3, fitting securing component 134 includes arcuately extending convex retention profiles 127 that are dimensioned to be received between an opposing pair of arcuately recessed concave insertion walls 108 of seat track 100 in a manner similar to arcuately extending convex retention profiles 126 of base component 132. As so configured, fitting securing component 134 may be assembled over base component 132 after base component 132 is first inserted into seat track 100 and slid from insertion position into locking position in the direction of the arrow shown in FIG. 5 so that each pair of arcuately extending convex retention profiles 126 is positioned within opposing internal anchor profiles 104 and centered beneath a pair of inner retention walls 106 as shown in dashed outline in FIG. 6. In this position, arcuately extending convex retention profiles 126 are prevented from upward removal from seat track 100 because they are retained within seat track 100 by opposing internal anchor profiles 104 and beneath inner retention walls 106. Although not present in this embodiment, it will be understood that each of arcuately extending convex retention profiles 127 of fitting securing component 134 may further be provided with optional retention shoulders 125, similar to those provided for the exemplary embodiment of fitting securing component 114 of FIG. 1.

FIGS. 7-10 show fitting securing component 134 assembled over base component 132 with base component 132 received in seat track 100 in locking position, i.e., with arcuately extending convex retention profiles 126 of base component 132 positioned within opposing internal anchor profiles 104 and centered beneath a pair of inner retention walls 106. At the same time, arcuately extending convex retention profiles 127 of fitting securing component 134 are received between an opposing pair of arcuately recessed concave insertion walls 108 of seat track 100 as shown to lock the assembly 130 in static position relative to elongated cavity 102 of seat track 100. In this regard, asymmetric seat track fitting assembly 130 is prevented from longitudinal movement in the elongated cavity 102 of seat track 100 by contact (interference) between retention profiles 127 of fitting securing component 134 and arcuately recessed concave insertion walls 108 of seat track 100. As shown in FIGS. 7-9, fitting securing component 134 is secured over base component 132 with inter-component fastener 120 which is inserted through countersunk inter-component fastener access opening 122 of fitting securing component 134 and threadably received in inter-component fastener retention opening 124 of base component 132 to secure fitting securing component 134 over base component 132 in its locked position relative to elongated cavity 102 of seat track 100.

FIG. 11 is a side view of base component 132 received within internal anchor profile 104 (shown in dashed line in FIG. 11) seat track 100. As shown in FIG. 11, upwardly extending securement block 138 extends to a position that is substantially even or coplanar with upper surface 103 of seat track 100. As previously described, internally component fastener retaining opening 118 is defined within upwardly extending securement block 138 as shown in dashed outline in FIG. 11. As such, the disclosed embodiment of base component 132 illustrated in FIG. 11 provides threads that extend from below to a position that is substantially even or coplanar with upper surface 103 for engagement with threaded component fastener 180, providing for increased length of thread engagement and strength for securing components to seat track 100.

FIG. 12 is a side view of fitting securing component 134 assembled to base component 132 of FIG. 11 to form asymmetric seat track fitting assembly 130 within seat track 100. As shown in FIG. 12, the upper surface 152 of fitting securing component 134 is positioned substantially coplanar with upper surface 103 of seat track 100. FIG. 12 further shows a component 1202 (e.g., seat, cabinet, partition, etc.) secured to seat track 100 by a component fastener 180, with lower surface 1212 of component 1200 contacting and being supported by each of upper surface 103 of seat track 100 and upper surface 152 of fitting securing component 134, e.g., in a flush mounting manner between the surfaces. In this way, additional load path in the lateral shear plane (X axis) is provided for component 1202. In one exemplary embodiment, component retaining fastener 180 may be secureably retained in component fastener retaining opening 118 with an optional self-locking feature, such as previously described in relation to FIG. 12.

It will be understood that the illustrated embodiments are exemplary only and that other configurations may be employed. For example, although base components 112 and 132 are each illustrated as having two pairs of opposing arcuately extending convex retention profiles 126, it will be understood that a base component may alternatively be provided with more than two pairs of opposing arcuately extending convex retention profiles 126, with each pair of arcuately extending convex retention profiles 126 being separated by narrowed profile sections 115. A seat track fitting assembly 110 or 130 may also be provided with more than one component fastener retaining opening 118, and/or with more than one alignment post 121/140 or more than one upwardly extending securement block 138. Further a seat track fitting assembly 110 or 130 may be provided with no inter-component fastener openings 124, or may be provided with one, two, or more than two inter-component fastener retention openings 124. Additionally, although externally threaded component fasteners 180 and corresponding internally threaded component fastener retaining openings 118 have been illustrated herein, any other fastener retention configuration may be employed that is suitable for retaining a component fastener 180 within a corresponding component fastener retaining opening 118. Similarly, although externally threaded inter-component fasteners 120 and corresponding internally threaded inter-component fastener retention openings 124 have been illustrated herein, any other fastener retention configuration may be employed that is suitable for retaining an inter-component fastener 180 within a corresponding inter-component fastener retention opening 124.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A seat track fitting assembly, comprising:
a base component having at least two pairs of opposing arcuately extending convex retention profiles separated by a narrowed profile section, said at least two pairs of opposing arcuately extending convex retention profiles of said base component being spaced and dimensioned to be aligned and received in an insertion position of said base component between any two respective opposing pairs of arcuately recessed concave insertion walls of a seat track so as to be inserted into opposing internal anchor profiles of said seat track, and said narrowed profile section of said base component being dimensioned to be received between opposing inner retention walls of said seat track when said base component is in said insertion position and said at least two pairs of opposing arcuately extending convex retention profiles are received between any two respective opposing pairs of arcuately recessed concave insertion walls of a seat track;
wherein said base component is further dimensioned to be positioned from said insertion position into a locking position within said opposing internal anchor profiles of said seat track so that said at least two pairs of opposing arcuately extending convex retention profiles of said base component are not aligned with any two respective opposing pairs of arcuately recessed concave insertion walls of said seat track, each of said at least two pairs of opposing arcuately extending convex retention profiles of said base component being positioned at least partially beneath a pair of opposing inner retention walls of said seat track when said base component is in said locking position;
wherein said seat track fitting assembly further comprises a fitting securing component dimensionally configured so that it can only be mated to said base component when said base component is in said locking position within said seat track, said fitting securing component comprising at least one pair of opposing arcuately extending convex retention profiles that are dimensioned so as to only be received between an opposing pair of arcuately recessed concave insertion walls of said seat track when said base component is in said locking position so that said base component is not positionable from said locking position to said insertion position due to interference contact between the arcuately extending convex retention profiles of the fitting securing component and the arcuately recessed concave insertion walls of said seat track when said fitting securing component is mated to said base component; and
wherein said base component further comprises a component fastener retaining opening defined therein, said component fastener retaining opening being configured for receiving a component fastener for securing a component to said seat track when said base component is in said locking position within said seat track;
wherein said fitting securing component further comprises at least one end extending outwardly from the at least one pair of opposing arcuately extending convex retention profiles;
wherein said seat track fitting assembly further comprises at least one inter-component fastener configured to fixedly couple said at least one outwardly extending end of the fitting securing component to said base component when said fitting securing component is mated to said base component with said base component in said locking position within said seat track;
wherein said base component further comprises an upwardly extending alignment post disposed between said first and second ends of said base component;
wherein said component fastener retaining opening is defined as an internally threaded opening within said alignment post and configured to receive external threads of an externally threaded component fastener, or wherein an upwardly extending securement block is disposed adjacent said first end of said base component, said component fastener retaining opening being defined as an internally threaded opening within said upwardly extending securement block and configured to receive external threads of an externally threaded component fastener; and
wherein said fitting securing component further comprises at least one opening defined therein that is configured to align with and receive the upwardly extending alignment post of the base component so as to align the fitting securing component with the case component when said fitting securing component is mated to said base component with said base component in said locking position within said seat track.

2. The seat track fitting assembly of claim 1, wherein an upper surface of said fitting securing component is positioned in substantially coplanar relationship with an upper surface of said seat track when said at least two pairs of opposing arcuately extending convex retention profiles of said base component are inserted into opposing internal anchor profiles of said seat track.

3. The seat track fitting assembly of claim 1, wherein said base component is an elongated member having opposing first and second ends, and wherein said at least two pairs of opposing arcuately extending convex retention profiles of said base component comprise a pair of opposing arcuately extending convex retention profiles disposed adjacent each of said first and second opposite ends of said base component with said component fastener retaining opening defined therebetween.

4. The seat track fitting assembly of claim 3, wherein said base component further comprises an upwardly extending alignment post disposed between said first and second ends of said base component, said component fastener retaining opening being defined as an internally threaded opening within said alignment post and configured to receive external threads of an externally threaded component fastener; and wherein said alignment post and said internal threads of said component fastener retaining opening extend from said base component to a substantially coplanar position with an upper surface of said seat track when said at least two pairs of opposing arcuately extending convex retention profiles of said base component are inserted into opposing internal anchor profiles of said seat track.

5. The seat track fitting assembly of claim 3, wherein said component fastener retaining opening is defined substantially midway between said opposing first and second ends of said base component; wherein said fitting securing component is an elongated member having opposing first and second ends, said fitting securing component further comprising a component fastener access opening defined therein substantially midway between said first and second ends of said fitting securing component; and wherein said component fastener retaining opening and said component fastener access opening are configured to be aligned to receive said component fastener when said fitting securing component is mated to said base component with said base component in said locking position within said seat track.

6. The seat track fitting assembly of claim 3, wherein said base component comprises an inter-component fastener retention opening defined adjacent each of said opposing first and second ends of said base component; wherein said fitting securing component is an elongated member having opposing first and second outwardly extending ends, said fitting securing component further comprising an inter-component fastener access opening defined adjacent each of said opposing first and second outwardly extending ends of said fitting securing component; and wherein each of said inter-component fastener access openings of said fitting securing component are configured to be aligned with a respective one of said inter-component fastener retention openings to receive a respective one of said inter-component fasteners when said fitting securing component is mated to said base component with said base component in said locking position within said seat track, each of said inter-component fasteners securing said fitting securing component to said base component.

7. The seat track fitting assembly of claim 1, wherein said base component is an elongated member having opposing first and second ends, and wherein said at least two pairs of opposing arcuately extending convex retention profiles of said base component comprise a pair of opposing arcuately extending convex retention profiles disposed adjacent each of said first and second opposite ends of said base component with said component fastener retaining opening defined adjacent said first end of said base component.

8. The seat track fitting assembly of claim 7, wherein said base component further comprises an upwardly extending securement block disposed adjacent said first end of said base component, said component fastener retaining opening being defined as an internally threaded opening within said upwardly extending securement block and configured to receive external threads of an externally threaded component fastener; and wherein said upwardly extending securement block and said internal threads of said component fastener retaining opening extend from said base component to a substantially coplanar position with an upper surface of said seat track when said at least two pairs of opposing arcuately extending convex retention profiles of said base component are inserted into opposing internal anchor profiles of said seat track.

9. The seat track fitting assembly of claim 7, wherein said fitting securing component is an elongated member having opposing first and second ends, said fitting securing component further comprising an alignment opening defined therein adjacent said first end of said fitting securing component; wherein said base component further comprises an upwardly extending alignment post disposed substantially midway between said first and second ends of said base component; and wherein said upwardly extending alignment post is configured to be received in said alignment opening when said fitting securing component is mated to said base component with said base component in said locking position within said seat track.

10. The seat track fitting assembly of claim 7, wherein said base component comprises an inter-component fastener retention opening defined adjacent said second end of said base component; wherein said fitting securing component is an elongated member having a second end extending outwardly from an opposing first end, said fitting securing component further comprising an inter-component fastener access opening defined adjacent said second outwardly extending end of said fitting securing component; and wherein said inter-component fastener access opening of said fitting securing component is configured to be aligned with said inter-component fastener retention opening of said base component to receive a respective inter-component fastener when said fitting securing component is mated to said base component with said base component in said locking position within said seat track, each of said inter-component fasteners securing said fitting securing component to said base component.

11. The seat track fitting assembly of claim 1, wherein said base component, fitting securing component, and said component fastener retaining opening are configured for together receiving a component fastener to secure securing a component to said seat track when said base component is in said locking position within said seat track such that a lower surface of the component contacts and s supported by each of an upper surface of the seat track and an upper surface of the fitting securing component.

12. The seat track fitting assembly of claim 11, wherein said component for securing comprises at least one of a seat, a cabinet, or a partition.

13. A seat track and seat track fitting assembly, comprising:
a seat track, said seat track comprising an elongated member having an upper surface and an elongated cavity that is oriented parallel to the longitudinal axis of said seat track, said elongated cavity including an elongated central access channel defined by opposing inner retention walls in said upper surface of said seat track and by insertion openings defined in said upper surface of said seat track by pairs of opposing arcuately recessed concave insertion walls, said elongated cavity also including an elongated anchor channel defined internally within said elongated member of said seat track beneath said elongated access channel by opposing internal anchor profiles; and a base component having at least two pairs of opposing arcuately extending convex retention profiles separated by a narrowed profile section, said at least two pairs of opposing arcuately extending convex retention profiles of said base component being spaced and dimensioned to be aligned and received in an insertion position of said base component between any two respective opposing pairs of said arcuately recessed concave insertion walls of said seat track so as to be inserted into said opposing internal anchor profiles of said seat track anchor channel, and said narrowed profile section of said base component being dimensioned to be received between said opposing inner retention walls of said access channel of said seat track when said base component is in said insertion position and said at least two pairs of opposing arcuately extending convex retention profiles are received between any two of said respective opposing pairs of arcuately recessed concave insertion walls of said seat track;

wherein said base component is further dimensioned to be positioned from said insertion position into a locking position within said opposing internal anchor profiles of said seat track so that said at least two pairs of opposing arcuately extending convex retention profiles of said base component are not aligned with any two respective opposing pairs of arcuately recessed concave insertion walls of said seat track, each of said at least two pairs of opposing arcuately extending convex retention profiles of said base component being positioned at least partially beneath a pair of opposing inner retention walls of said seat track when said base component is in said locking position;

wherein said seat track fitting assembly further comprises a fitting securing component dimensionally configured so that it can only be mated to said base component when said base component is in said locking position within said seat track, said fitting securing component comprising at least one pair of opposing arcuately extending convex retention profiles that are dimensioned so as to only be received between an opposing pair of said arcuately recessed concave insertion walls of said seat track when said base component is in said locking position so that said base component is not positionable within said seat track anchor channel from said locking position to said insertion position due to interference contact between the arcuately extending convex retention profiles of the fitting securing component and the arcuately recessed concave insertion walls of said seat track when said fitting securing component is mated to said base component; and wherein said base component further comprises a component fastener retaining opening defined therein, said component fastener retaining opening being configured for receiving a component fastener for securing a component to said seat track when said base component is in said locking position within said seat track;

wherein said fitting securing component further comprises at least one end extending outwardly from the at least one pair of opposing arcuately extending convex retention profiles;

wherein said seat track fitting assembly further comprises at least one inter-component fastener configured to fixedly couple said outwardly extending end of the fitting securing component to said base component when said fitting securing component is mated to said base component with said base component in said locking position within said seat track;

wherein said base component further comprises an upwardly extending alignment post disposed between said first and second ends of said base component;

wherein said component fastener retaining opening is defined as an internally threaded opening within said alignment post and configured to receive external threads of an externally threaded component fastener, or wherein an upwardly extending securement block is disposed adjacent said first end of said base component, said component fastener retaining opening being defined as an internally threaded opening within said upwardly extending securement block and configured to receive external threads of an externally threaded component fastener; and wherein said fitting securing component further comprises at least one opening defined therein that is configured to align with and receive the upwardly extending alignment post of the base component so as to align the fitting securing component with the case component when said fitting securing component is mated to said base component with said base component in said locking position within said seat track.

14. The assembly of claim 13, wherein an upper surface of said fitting securing component is positioned in substantially coplanar relationship with said upper surface of said seat track when said at least two pairs of opposing arcuately extending convex retention profiles of said base component are inserted into opposing internal anchor profiles of said seat track anchor channel.

15. The assembly of claim 13, wherein said base component is an elongated member having opposing first and second ends, and wherein said at least two pairs of opposing arcuately extending convex retention profiles of said base component comprise a pair of opposing arcuately extending convex retention profiles disposed adjacent each of said first and second opposite ends of said base component with said component fastener retaining opening defined therebetween.

16. The assembly of claim 15, wherein said base component further comprises an upwardly extending alignment post disposed between said first and second ends of said base component, said component fastener retaining opening being defined as an internally threaded opening within said alignment post and configured to receive external threads of an externally threaded component fastener; and wherein said alignment post and said internal threads of said component fastener retaining opening extend from said base component to a substantially coplanar position with said upper surface of said seat track when said at least two pairs of opposing arcuately extending convex retention profiles of said base component are inserted into opposing internal anchor profiles of said seat track anchor channel.

17. The assembly of claim 15, wherein said component fastener retaining opening is defined substantially midway between said opposing first and second ends of said base component; wherein said fitting securing component is an elongated member having opposing first and second ends, said fitting securing component further comprising a component fastener access opening defined therein substantially midway between said first and second ends of said fitting securing component; and wherein said component fastener retaining opening and said component fastener access opening are configured to be aligned to receive said component fastener when said fitting securing component is mated to said base component with said base component in said locking position within said seat track.

18. The assembly of claim 15, wherein said base component comprises an inter-component fastener retention opening defined adjacent each of said opposing first and second ends of said base component; wherein said fitting securing component is an elongated member having opposing first and second outwardly extending ends, said fitting securing component further comprising an inter-component fastener access opening defined adjacent each of said opposing first and second outwardly extending ends of said fitting securing component; and wherein each of said inter-component fastener access openings of said fitting securing component are configured to be aligned with a respective one of said inter-component fastener retention openings to receive a respective one of said inter-component fasteners when said fitting securing component is mated to said base component with said base component in said locking position within said seat track, each of said inter-component fasteners securing said fitting securing component to said base component.

19. The assembly of claim 13, wherein said base component is an elongated member having opposing first and second ends, and wherein said at least two pairs of opposing arcuately extending convex retention profiles of said base component comprise a pair of opposing arcuately extending convex retention profiles disposed adjacent each of said first and second opposite ends of said base component with said component fastener retaining opening defined adjacent said first end of said base component.

20. The assembly of claim 19, wherein said base component further comprises an upwardly extending securement block disposed adjacent said first end of said base component, said component fastener retaining opening being defined as an internally threaded opening within said upwardly extending securement block and configured to receive external threads of an externally threaded component fastener; and wherein said upwardly extending securement block and said internal threads of said component fastener retaining opening extend from said base component to a substantially coplanar position with said upper surface of said seat track when said at least two pairs of opposing arcuately extending convex retention profiles of said base component are inserted into opposing internal anchor profiles of said seat track anchor channel.

21. The assembly of claim 19, wherein said fitting securing component is an elongated member having opposing first and second ends, said fitting securing component further comprising an alignment opening defined therein adjacent said first end of said fitting securing component; wherein said base component further comprises an upwardly extending alignment post disposed substantially midway between said first and second ends of said base component; and wherein said upwardly extending alignment post is configured to be received in said alignment opening when said fitting securing component is mated to said base component with said base component in said locking position within said seat track anchor channel.

22. The assembly of claim 19, wherein said base component comprises an inter-component fastener retention opening defined adjacent said second end of said base component; wherein said fitting securing component is an elongated member having a second end extending outwardly from an opposing first end, said fitting securing component further comprising an inter-component fastener access opening defined adjacent said second outwardly extending end of said fitting securing component; and wherein said inter-component fastener access opening of said fitting securing component is configured to be aligned with said inter-component fastener retention opening of said base component to receive a respective inter-component fastener when said fitting securing component is mated to said base component with said base component in said locking position within said seat track, each of said inter-component fasteners securing said fitting securing component to said base component.

23. The assembly of claim 13, wherein said base component, fitting securing component, and said component fastener retaining opening are configured for together receiving a component fastener to secure securing a component to said seat track when said base component is in said locking position within said seat track such that a lower surface of the component contacts and s supported by each of an upper surface of the seat track and an upper surface of the fitting securing component.

24. The seat track fitting assembly of claim 23, wherein said component for securing comprises at least one of a seat, a cabinet, or a partition.

25. A method of securing a component to a seat track, comprising:
providing a seat track, said seat track comprising an elongated member having an upper surface and an elongated cavity that is oriented parallel to the longitudinal axis of said seat track, said elongated cavity including an elongated central access channel defined by opposing inner retention walls in said upper surface of said seat track and by insertion openings defined in said upper surface of said seat track by pairs of opposing arcuately recessed concave insertion walls, said elongated cavity also including an elongated anchor channel defined internally within said elongated member of said seat track beneath said elongated access channel by opposing internal anchor profiles;
providing a seat track fitting assembly, comprising:
a base component having at least two pairs of opposing arcuately extending convex retention profiles separated by a narrowed profile section, said at least two pairs of opposing arcuately extending convex retention profiles of said base component being spaced and dimensioned to be aligned and received in an insertion position of said base component between any two respective opposing pairs of arcuately recessed concave insertion walls of a seat track so as to be inserted into opposing internal anchor profiles of said seat track, and said narrowed profile section of said base component being dimensioned to be received between opposing inner retention walls of said seat track when said base component is in said insertion position and said at least two pairs of opposing arcuately extending convex retention profiles are received between any two respective opposing pairs of arcuately recessed concave insertion walls of a seat track,
wherein said base component is further dimensioned to be positioned from said insertion position into a locking position within said opposing internal anchor profiles of said seat track so that said at least two pairs of opposing arcuately extending convex retention profiles of said base component are not aligned with any two respective opposing pairs of arcuately recessed concave insertion walls of said seat track, each of said at least two pairs of opposing arcuately extending convex retention profiles of said base component being positioned at least partially beneath a pair of opposing inner retention walls of said seat track when said base component is in said locking position, wherein said seat track fitting assembly further comprises a fitting securing component dimensionally configured so that it can only be mated to said base component when said base component is in said locking position within said seat track, said fitting securing component comprising at least one pair of opposing arcuately extending convex retention profiles that are dimensioned so as to only be received between an opposing pair of arcuately recessed concave insertion walls of said seat track when said base component is in said locking position so that said base component is not positionable from said locking position to said insertion position due to interference contact between the arcuately extending convex retention profiles of the fitting securing component and the arcuately recessed concave insertion walls of said seat track when said fitting securing component is mated to said base component, and wherein said base component further comprises a component fastener retaining opening defined therein, said component fastener retaining opening being configured for receiving a component fastener for securing a component to said seat track when said base component is in said locking position within said seat track, wherein said fitting securing component further comprises at least one end extending outwardly from the at least one pair of opposing arcuately extending convex retention profiles, wherein said seat track fitting assembly further comprises at least one inter-component fastener configured to fixedly couple said at least one outwardly extending end of the fitting securing component to said base component when said fitting securing component is mated to said base component with said base component in said locking position within said seat track, wherein said base component further comprises an upwardly extending alignment post disposed between said first and second ends of said base component, wherein said component fastener retaining opening is defined as an internally threaded opening within said alignment post and configured to receive external threads of an externally threaded component fastener, or wherein an upwardly extending securement block is disposed adjacent said first end of said base component, said component fastener retaining opening being defined as an internally threaded opening within said upwardly extending securement block and configured to receive external threads of an externally threaded component fastener, and wherein said fitting securing component further comprises at least one opening defined therein that is configured to align with and receive the upwardly extending alignment post of the base component so as to align the fitting securing component with the case component when said fitting securing component is mated to said base component with said base component in said locking position within said seat track;

aligning said at least two pairs of opposing arcuately extending convex retention profiles of said base component in an insertion position between two respective opposing pairs of said arcuately recessed concave insertion walls of said seat track and inserting said two pairs of opposing arcuately extending convex retention profiles of said base component through said two respective opposing pairs of said arcuately recessed concave insertion walls of said seat track into said opposing internal anchor profiles of said seat track anchor channel with said narrowed profile section of said base component received between said opposing inner retention walls of said access channel of said seat track;

moving said base component from said insertion position into a locking position within said opposing internal anchor profiles of said seat track so that said at least two pairs of opposing arcuately extending convex retention profiles of said base component are not aligned with any two respective opposing pairs of arcuately recessed concave insertion walls of said seat track, and so that each of said at least two pairs of opposing arcuately extending convex retention profiles of said base component are positioned at least partially beneath a pair of opposing inner retention walls of said seat track;

assembling a fitting securing component to said base component only when said base component is in said locking position within said seat track by positioning said at least one pair of opposing arcuately extending convex retention profiles of said fitting securing component between an opposing pair of said arcuately recessed concave insertion walls of said seat track when said base component is in said locking position so that said base component is not positionable within said seat track anchor channel from said locking position to said insertion position due to interference contact between the arcuately extending convex retention profiles of the fitting securing component and the arcuately recessed concave insertion walls of said seat track; and securing a component to said assembly of said base component and said fitting securing component, by positioning a component fastener within said component fastener retaining opening of said base component to secure said component to said seat track when said base component is in said locking position within said seat track.

26. The method of claim 25, further comprising positioning an upper surface of said fitting securing component in substantially coplanar relationship with said upper surface of said seat track when said at least two pairs of opposing arcuately extending convex retention profiles of said base component are inserted into said opposing internal anchor profiles of said seat track anchor channel.

27. The method of claim 25, wherein said base component is an elongated member having opposing first and second ends, and wherein said at least two pairs of opposing arcuately extending convex retention profiles of said base component comprise a pair of opposing arcuately extending convex retention profiles disposed adjacent each of said first and second opposite ends of said base component with said component fastener retaining opening defined therebetween.

28. The method of claim 27, wherein said base component further comprises an upwardly extending alignment post disposed between said first and second ends of said base component, said component fastener retaining opening being defined as an internally threaded opening within said alignment post and configured to receive external threads of an externally threaded component fastener; and wherein said method further comprises positioning each of said alignment post and said internal threads of said component fastener to extend from said base component to a substantially coplanar position with said upper surface of said seat track when said at least two pairs of opposing arcuately extending convex retention profiles of said base component are inserted into opposing internal anchor profiles of said seat track anchor channel.

29. The method of claim 27, wherein said component fastener retaining opening is defined substantially midway between said opposing first and second ends of said base component; wherein said fitting securing component is an elongated member having opposing first and second ends, said fitting securing component further comprising a component fastener access opening defined therein substantially midway between said first and second ends of said fitting securing component; and wherein said method further comprises positioning said component fastener retaining opening and said component fastener access opening and inserting said component fastener through said aligned component fastener access opening and component fastener retaining opening when said fitting securing component is assembled to said base component with said base component in said locking position within said seat track.

30. The method of claim 27, wherein said base component comprises an inter-component fastener retention opening defined adjacent each of said opposing first and second ends of said base component; wherein said fitting securing component is an elongated member having opposing first and second outwardly extending ends, said fitting securing component further comprising an inter-component fastener access opening defined adjacent each of said opposing first and second outwardly extending ends of said fitting securing component; and wherein said method further comprises aligning each of said inter-component fastener access openings of said fitting securing component with a respective one of said inter-component fastener retention openings and inserting an inter component fastener through each of said aligned inter-component fastener access openings and said inter-component fastener retention openings when said fitting securing component is assembled to said base component with said base component in said locking position within said seat track to secure said fitting securing component to said base component.

31. The method of claim 25, wherein said base component is an elongated member having opposing first and second ends, and wherein said at least two pairs of opposing arcuately extending convex retention profiles of said base component comprise a pair of opposing arcuately extending convex retention profiles disposed adjacent each of said first and second opposite ends of said base component with said component fastener retaining opening defined adjacent said first end of said base component.

32. The method of claim 31, wherein said base component further comprises an upwardly extending securement block disposed adjacent said first end of said base component, said component fastener retaining opening being defined as an internally threaded opening within said upwardly extending securement block and configured to receive external threads of an externally threaded component fastener; and wherein said method further comprises positioning each of said upwardly extending securement block and said internal threads of said component fastener retaining opening to extend from said base component to a substantially coplanar position with said upper surface of said seat track when said at least two pairs of opposing arcuately extending convex retention profiles of said base component are inserted into opposing internal anchor profiles of said seat track anchor channel.

33. The method of claim 31, wherein said fitting securing component is an elongated member having opposing first and second ends, said fitting securing component further comprising an alignment opening defined therein adjacent said first end of said fitting securing component; wherein said base component further comprises an upwardly extending alignment post disposed substantially midway between aid first and second ends of said base component; and wherein said method further comprises positioning said upwardly extending alignment post of said base component within said alignment opening of said fitting securing component when said fitting securing component is assembled to said base component with said base component in said locking position within said seat track anchor channel.

34. The method of claim 31, wherein said base component comprises an inter-component fastener retention opening defined adjacent said second end of said base component; wherein said fitting securing component is an elongated member having a second end extending outwardly from an opposing first end, said fitting securing component further comprising an inter-component fastener access opening defined adjacent said second outwardly extending end of said fitting securing component; and wherein said method further comprises aligning said inter-component fastener access opening of said fitting securing component with said inter-component fastener retention opening and inserting an inter-component fastener through said aligned inter-component fastener access opening and said inter-component fastener retention opening when said fitting securing component is assembled to said base component with said base component in said locking position within said seat track to secure said fitting securing component to said base component.

* * * * *